L. W. DAVIS.
FRICTION TRANSMISSION.
APPLICATION FILED OCT. 17, 1916.

1,241,609.

Patented Oct. 2, 1917.

Inventor
Lewis W. Davis
By Fred P. Goins
Attorney

UNITED STATES PATENT OFFICE.

LEWIS W. DAVIS, OF SEATTLE, WASHINGTON.

FRICTION TRANSMISSION.

1,241,609.

Specification of Letters Patent.

Patented Oct. 2, 1917.

Application filed October 17, 1916. Serial No. 126,060.

*To all whom it may concern:*

Be it known that I, LEWIS W. DAVIS, a citizen of the United States, and a resident of Seattle, in the county of King and State of Washington, have invented certain new and useful Improvements in Friction Transmission, of which the following is a full, true, and exact specification.

My invention relates to improvements in friction drive transmission particularly for automobile use and has for its principal object to generally improve upon and simplify the friction transmission as set forth in my previous Patent No. 1,107,705, filed August 18th, 1914.

Some of the more important features of my improved device are, a self contained combination supporting frame for the friction mechanism and jack shaft; means for slidably mounting the combination frame with respect to the rear axle of an automobile; means for swinging the friction drive with respect to the supporting frame and friction driven shaft; a sub-frame for supporting the friction mechanism which embodies three points of support, two of which are on the rear axle and one on the chassis near the front of a machine. An additional object is the elimination of all eccentric bearings upon the main shaft of my device.

Figure 1:
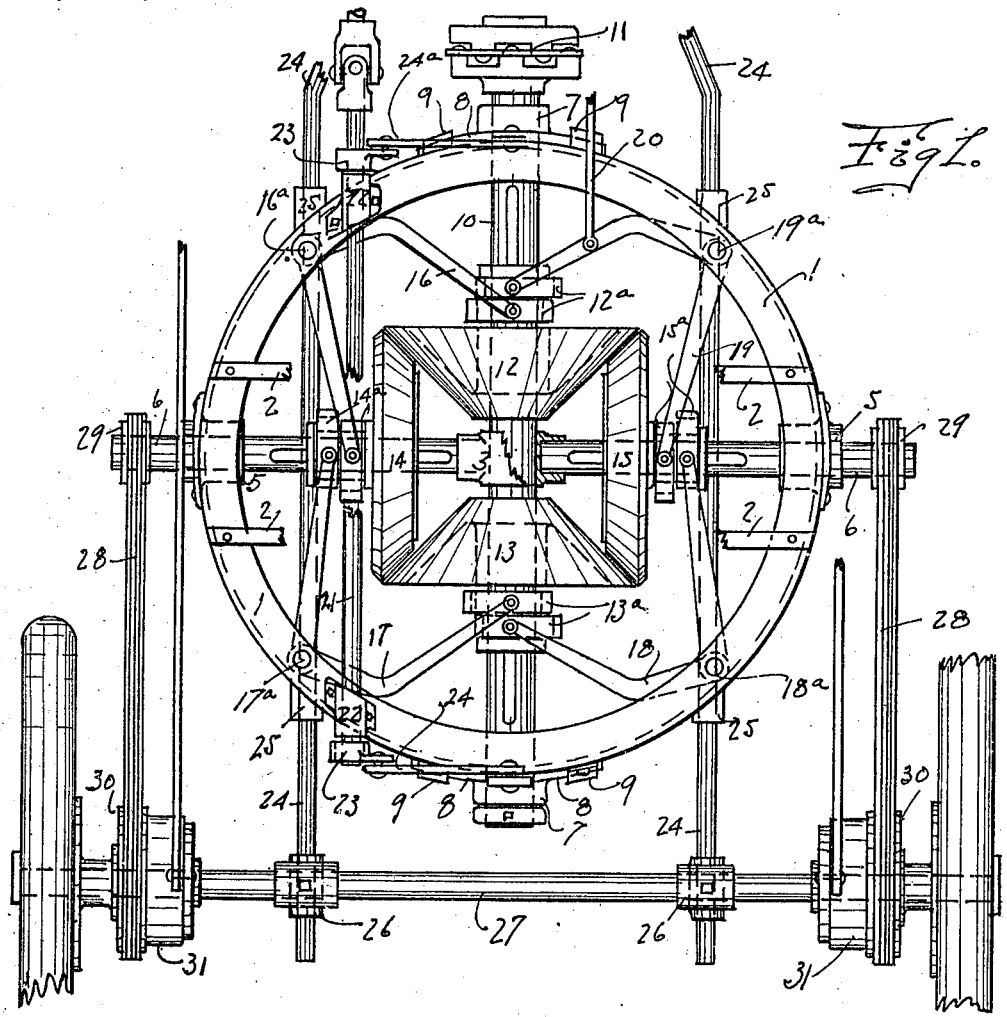
Figure 2:
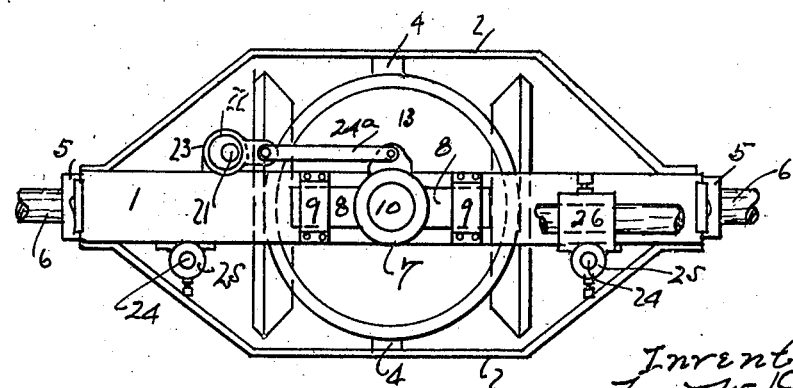

Other objects will appear as my invention is more fully explained in the following specifications, illustrated in the accompanying drawing and pointed out in the appended claims:

In the drawings Figure 1 is a plan view of my device shown detached from a chassis with parts broken away. Fig. 2 is a rear elevation of same with parts broken away.

Referring more particularly to the drawings, numeral 1 indicates a circular supporting frame, preferably of channel shape and welded into a continuous ring. Stiffening yokes 2 are placed on either side of supporting frame 1 and cross it diametrically. The yokes may be held above or below the central plan of the frame 1 and are preferably on both sides thereof. A central bearing 3 is supported from the yoke 2 by arms 4. Frame 1 has diametrically opposite bearings 5 which line with central bearings and support jack shafts 6 which also take bearing in central bearing 3. Friction drive shaft bearings 7 are mounted on the outer periphery of frame 1 and lie at right angles to and in a horizontal plane with jack shafts 6. The bearings 7 are slidable horizontally by means of lugs 8 which slidably engage housings 9 which in turn are secured to frame 1. Bearings 7 support a friction drive shaft 10 which is connected to the main drive shaft from the engine by means of a flexible coupling which includes a leather connection 11. The frame 1 is slotted in line with bearings 7 so that the shaft 10 has radial movements about bearing 3 which fits the said shaft loosely in a horizontal direction. Cone drive frictions 12 and 13 are feather keyed to shaft 10 and disk driven frictions 14 and 15 are similarly keyed to jack shafts 6 and are arranged to contact with frictions 12 and 13. Frictions 12, 13, 14 and 15 each have oblong slotted shift rings 12$^a$, 13$^a$, 14$^a$ and 15$^a$ respectively. Bell crank levers 16, 17, 18 and 19 are pivotally connected to pins 16$^a$, 17$^a$, 18$^a$ and 19$^a$ respectively. One end each of levers 16 and 17 are connected to opposite shift rings 14$^a$ while the other ends are connected to one of shift rings 12$^a$ and 13$^a$ respectively. Levers 18 and 19 are similarly connected to shift rings 15$^a$ and 12$^a$ and 13$^a$. The frictions and bell crank levers just described, are operated by a shift rod 20 which may be connected to any one of the bell cranks directly or through the medium of other levers and links. The shift rod 20 leads to a convenient point for the driver to operate by means of any convenient form of hand lever which is here not shown. This operation of the frictions varies the speed ratio as clearly set forth in my previous patent referred to above. The driving and driven frictions are brought into contact in pairs either to give a forward or backward motion to the car by swinging the bearings 7 with respect to the frame 1. This swinging is accomplished by means of a shaft 21 which is revolubly supported in bearings 22 which are in turn mounted upon frame 1. Oppositely disposed eccentrics 23 are secured to shaft 21 adjacent bearings 22 and are connected to bearings 7 by means of links 24. The eccentrics 23 are so arranged that when shaft 21 is revolved the fraction of a revolution in one direction it will throw the bearings 7 clock wise until frictions 12 and 15 and 13 and 14 are brought into contact in pairs. By turning the shaft 21 in the opposite direction the bearings 7 are moved counter clock wise until the frictions 12 and 14 and 13 and 15 are brought into contact.

The moving of the shaft 21 is accomplished from the driver's seat preferably by foot levers. Frame 1 is slidably supported upon truss rods 24 which rest in bearings 25 which in turn are secured to the said frame. The rear end of truss rods 24 are secured in bearings 26 which are supported by the rear axle 27 of the automobile. The forward ends of truss rods 24 are carried well forward under the chassis and are brought together in a common point of support. It will be thus seen that either the entire friction drive mechanism or the rear axle may be moved forward or backward along the truss rods 24. The rear axle 27 is driven from the jack shafts 6 by means of chain drives 28 and sprockets 29 and 30. The speed of the machine may be changed by varying the ratio of sprockets 29 and 30. In changing the said sprockets the same chain may be used by varying the distance between jack shafts 6 and rear axle 27. Expanding brakes 31 are secured to the said rear axle and to sprockets 30 and are operable in the usual manner from the driver's seat. In operating my device it is only necessary to draw the friction into contact by means of the shaft 21 and to shift the frictions to any desired speed point by means of the rod 20. The movable bearings 7 and the flexible drive shaft enable the friction to be brought into either the forward or backward motion without the use of eccentrics as in my previous application.

While I have shown a particular form of embodiment of my invention, I am aware that many minor changes therein will readily suggest themselves to others skilled in the art without departing from the spirit and scope of the invention, and I therefore desire to avoid being limited to the exact form shown and described, except as pointed out in the appended claims. Having described my invention, what I claim as new and desire to protect by Letters Patent, is—

1. In a variable speed transmission device, the combination of a supporting frame, a driving shaft mounted thereon and horizontally slidable thereon, a pair of similar jack shafts arranged at right angles to the said driving shaft and having solid bearings upon the said frame, a pair of friction driving cones feather keyed to the driving shaft, a pair of driven friction disks similarly keyed one to each of the jack shafts, means for simultaneously moving the said cones and disks along their respective shaft, means for horizontally rotating the said driving shaft with respect to the frame and said jack shafts, whereby either friction cone is brought into contact with either friction disk thereby driving the jack shafts either forward or backward.

2. In a variable speed transmission device, the combination of a supporting frame, a driving shaft mounted thereon and horizontally slidable therewith, a pair of similar jack shafts arranged at right angles to the said driving shaft and having solid bearings upon the said frame, a pair of friction driving cones feather keyed to the driving shaft, a pair of driven friction disks similarly keyed one to each of the jack shafts, means for simultaneously moving the said cones and disks along their respective shaft, means for horizontally rotating the said driving shaft with respect to the frame and said jack shafts, whereby either friction cone is brought into contact with either friction disk, thereby driving the jack shafts either forward or backward; said rotating means including oppositely disposed eccentrics mounted upon a common and independent shaft, driving shaft bearings slidably mounted upon said supporting frame and connecting means between the said bearings and the said eccentrics, whereby the movement of the eccentrics moves the said bearings and driving shaft.

3. The combination with a rear axle and chassis and traction wheels of an automobile, of truss rods one end of each of which is slidably suspended from said rear axle, a circular supporting frame slidably mounted upon said truss rods, a driving shaft mounted on said supporting frame and horizontally slidable therewith, a pair of jack shafts arranged at right angles to said driving shaft and having solid bearings upon the said frame, a pair of similar friction driving cones feather keyed to the driving shaft, a pair of friction disks similarly keyed one to each of the jack shafts, means for simultaneously moving the cones and disks along the shafts and with respect to each other, means for moving the said driving shaft horizontally about the center of the said supporting frame, whereby either friction cone is brought into contact with either friction disk, thereby driving the jack shafts either forward or backward, and transmission means connecting the said jack shafts with the said traction wheels, whereby the traction wheels are driven either forward or backward.

4. The combination with a rear axle and chassis and traction wheels of an automobile, of truss rods one end of each of which is slidably suspended from said rear axle, a circular supporting frame slidably mounted upon said truss rods, a driving shaft mounted on said supporting frame and horizontally slidable therewith, a pair of jack shafts arranged at right angles to said driving shaft and having solid bearings upon the said frame, a pair of similar friction driving cones feather keyed to the driving shaft, a pair of friction disks similarly keyed one to each of the jack shafts, means for simultaneously moving the cones and disks along the shafts and with respect to each other, means for moving the said driving shaft horizontally about the center of the said supporting frame, said last mentioned means including oppositely disposed eccentrics mounted upon a common and independent shaft and drive shaft bearings horizontally and slidably mounted upon the circular supporting frame and rods connecting the said bearings and the said eccentrics, whereby when the said independent shaft is revolved in either direction certain pairs of friction cones and disks are brought into contact.

LEWIS W. DAVIS.

Copies of this patent may be obtained for five cents each, by addressing the "Commissioner of Patents, Washington, D. C."